L. WOJIDKOW.
COFFEE POT HANDLE.
APPLICATION FILED FEB. 20, 1913.
1,090,808.
Patented Mar. 17, 1914.
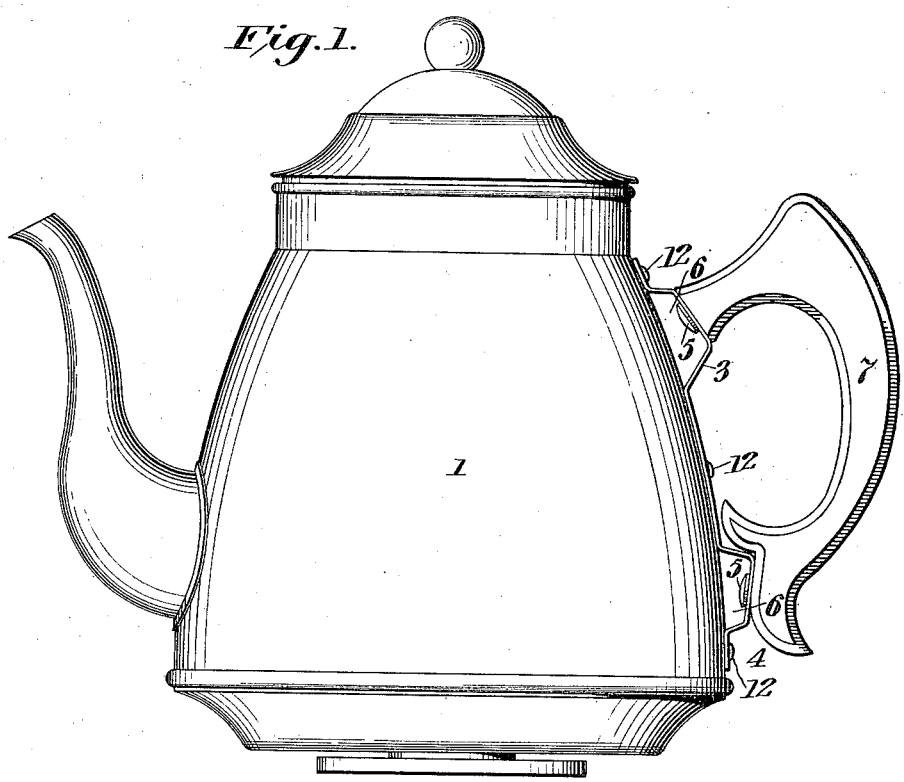
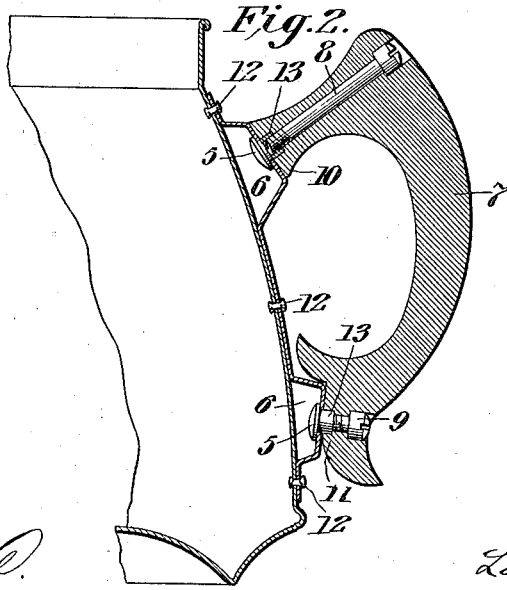
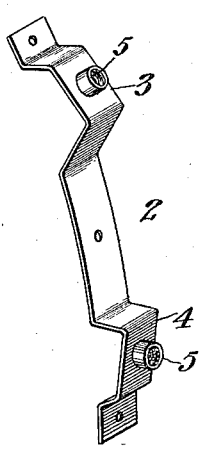

UNITED STATES PATENT OFFICE.

LOUIS WOJIDKOW, OF BROOKLYN, NEW YORK, ASSIGNOR TO NEW YORK STAMPING COMPANY, OF BROOKLYN, NEW YORK, A CORPORATION OF NEW YORK.

COFFEE-POT HANDLE.

1,090,808.   Specification of Letters Patent.   Patented Mar. 17, 1914.

Application filed February 20, 1913. Serial No. 749,693.

*To all whom it may concern:*

Be it known that I, LOUIS WOJIDKOW, a citizen of the United States, residing at Brooklyn, in the county of Kings and State of New York, have invented a certain new and useful Improvement in Coffee-Pot Handles, of which the following is a full, clear, and exact description.

The object of this invention is to provide means for attaching wooden or other handles to coffee pots and other vessels, and particularly such as are to contain hot fluids or other hot substances, in such manner that the handle will be accurately as well as securely applied, and will be separated from the body of the vessel by air spaces so as to avoid or minimize the effect of radiated heat, and thus prevent the injurious or disagreeable heating of the handle.

The invention consists of a bracket adapted to be riveted or otherwise permanently applied to the body of the vessel, and having integral therewith two or more air-cooled steps to which the wooden or other handle is secured, whereby the handle attaching parts are alined and the handle accurately applied to the vessel, as I will proceed now to explain and finally claim.

In the accompanying drawings illustrating the invention, in the several figures of which like parts are similarly designated, Figure 1 is a side elevation of a coffee pot provided with the present invention. Fig. 2 is a vertical section of the handle-attaching portion of the coffee pot. Fig. 3 is a perspective view of the attaching bracket detached.

1 may represent a vessel to which the invention is applied, and in this instance a metal coffee pot is shown. Instead of attaching the handle to the vessel directly, or by means of separately attached posts or brackets, I use a bracket, shown in detail in Fig. 3, made to conform to the contour of the body of the vessel at the point of application, and adapt it to be secured thereto by rivets.

Without thereby limiting the invention to any particular material, or to the method of its production, I will proceed to describe the particular construction illustrated. The bracket 2, Fig. 3, may be conveniently made of a strip of sheet metal bent to conform to the contour of the vessel to which it is to be applied, and having the elevations or steps 3, 4, in number equal to the number of points of attachment of the handle, in this instance, two. These steps are so shaped and disposed as to coincide with the attaching points of the handle. Each step is provided with a screwthreaded socket 5, in this instance shown as an internally threaded hollow rivet, permanently secured to the steps so as to be in position to receive the handle attaching screws without otherwise holding them in place while attaching the handle. These steps stand off from the body of the vessel so as to leave air spaces 6 for the free circulation of air, in order to minimize the effects of radiation from the vessel, and thus keep the handle cool and preserve it from the injurious effects of radiation. As shown, the handle 7 is of conventional form, and may be made of wood or other suitable or usual material. The opposite ends of the handle are perforated for the passage of fastening screws 8 and 9, which extend into the perforations and into engagement with the screwthreaded sockets 5 in the steps. The ends 10 and 11 of the handle are shaped to fit the steps so that the handle will come to a square bearing on the steps. The bracket 2 may be applied to the vessel by any suitable means, but I prefer to secure it by means of rivets 12.

In order to relieve the screws 8 and 9 of the necessity of taking all of the strains of attachment, I prefer to have the screw sockets 5 project beyond the levels of the steps substantially as shown in Figs. 2 and 3, and to enter holes or recesses 13 in the adjacent portions of the handle, so that these screw sockets take in part the longitudinal and lateral strains placed upon the handle in use. The use of a bracket having integral with it steps to receive the handle, insures that these steps will be accurately alined, as well as spaced apart, without dependence upon the accuracy of the workman. The steps standing off from the body of the vessel with air spaces formed by them between the handle and the vessel, insure circulation of air sufficient to minimize radiation from the vessel and thus obviate the deleterious effects of radiation on the handle, as well as on the steps and the mediums for connecting the handle and steps.

As already sufficiently indicated, the invention is not limited to the details of construction, or to the material from which the parts are made, so long as the handle-receiving steps are inseparably connected with one another and thereby adapted to be applied simultaneously; and the preferred construction also provides for the permanence of those members of the fastening mediums, in this instance the internally screwthreaded sockets 5, which are on the steps. Also it is to be noted that nothing herein or in the claims is to be taken as limiting the invention to its use on coffee pots.

What I claim is:—

1. A bracket for attaching to a vessel a handle of the type which has a plurality of terminals, said bracket constructed of a single strip of metal of a profile to conform to the place of attachment to the vessel and formed with offstanding steps equal in number to the number of attaching terminals on the handle, whereby the steps are definitely and acurately alined in fixed relation one with the other and may be properly positioned on the vessel to receive the handle.

2. The combination with a vessel, of a handle which has a plurality of attaching terminals, and a handle-attaching bracket composed of a strip of sheet metal bent to conform to the contour of the vessel and having in one piece therewith offstanding steps equal in number to the number of attaching terminals, whereby the steps are definitely and accurately alined in fixed relation one with the other and properly positioned on the vessel to receive the handle, said steps having outwardly projecting sockets adapted to engage the attaching terminals and to receive the means for fastening the handle to the bracket, and said steps furthermore affording air spaces between the vessel and the handle terminals.

3. The combination with a vessel, of a handle-attaching bracket permanently applied to the vessel and constructed of a single strip of metal formed with offstanding steps to receive the ends of the handle and permanent screw sockets in said steps, said steps affording air spaces between themselves and the vessel, a handle having ends adapted to conform to the shape and location of the steps, and screws passed through the handle ends and into the screw sockets in the steps to affix the handle to the steps.

4. The combination with a vessel, of a handle-attaching bracket constructed of a single strip of metal having a profile matching that of the vessel whereon it is used and permanently applied to such vessel and having offstanding steps, and outwardly projecting screw sockets on said steps, a handle having recesses into which these projecting screw sockets extend, and screws passed through the handle into binding engagement with the screw sockets.

In testimony whereof I have hereunto set my hand this 19 day of February A. D. 1913.

LOUIS WOJIDKOW.

Witnesses:
 FRED C. WOJIDKOW,
 R. W. SHELTER.

---

Copies of this patent may be obtained for five cents each, by addressing the "Commissioner of Patents, Washington, D. C."